United States Patent Office 3,381,172
Patented Apr. 30, 1968

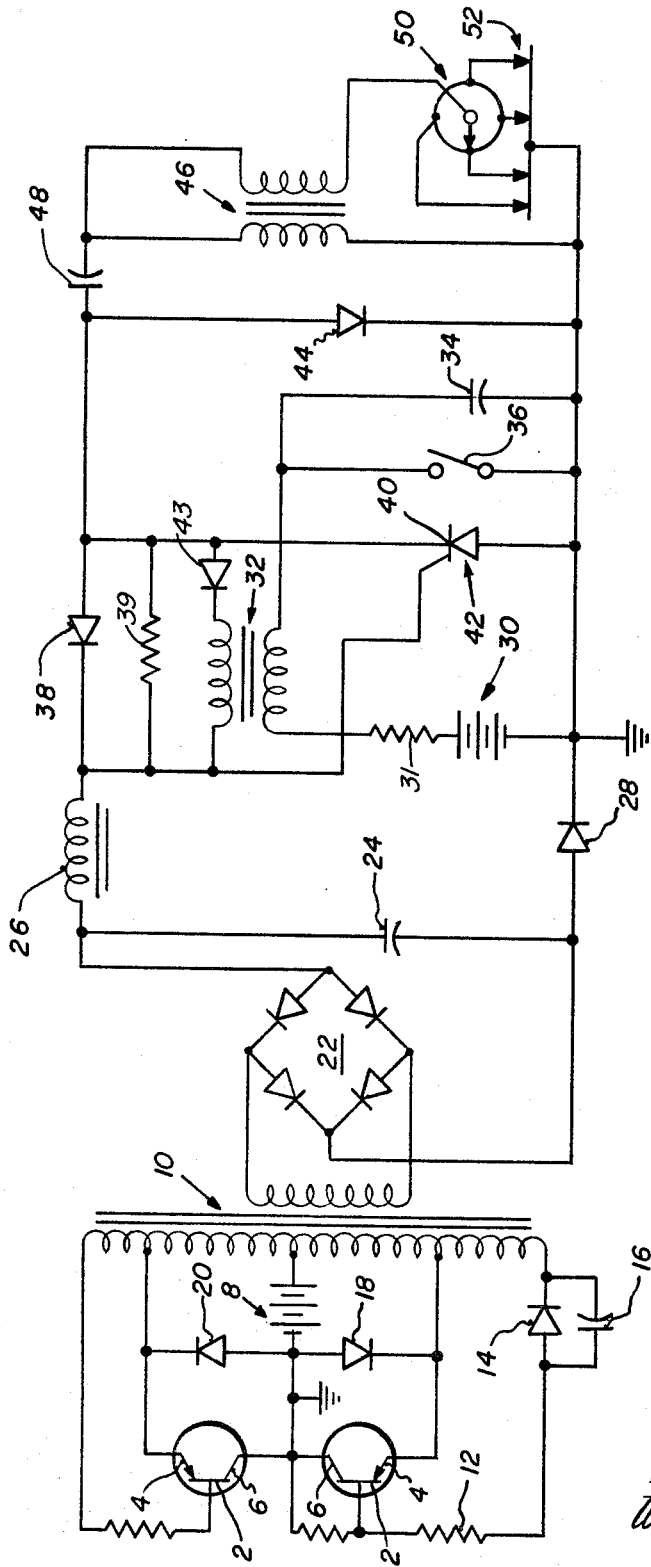

3,381,172
SOLID STATE SILICON CONTROL RECTIFIER IGNITION SYSTEM FOR INTERNAL COMBUSTION ENGINES
Phillip J. Weiner, 8026 Plymouth Ave. N., Minneapolis, Minn. 55427
Filed Aug. 23, 1965, Ser. No. 481,644
2 Claims. (Cl. 315—212)

ABSTRACT OF THE DISCLOSURE

An automotive ignition system utilizing an oscillator to provide a high DC potential to a charging capacitor which discharges upon opening of the points through a coil and a periodically switched SCR.

This invention relates to spark ignition systems, and more particularly to transistor oscillator ignition systems utilizing a silicon control rectifier.

The prior art is replete with many types of ignition systems which have shortcomings for one reason or another. One of the many reasons is the use of vacuum and gas filled tubes which are subject to vibration problems and breakage. Another problem is the requirement that special coils and/or capacitors must be used in place of the components normally provided with the automobile.

The present invention overcomes these prior art difficulties by supplying a high direct voltage from a transistor oscillator and rectifier combination to a storage capacitor. This capacitor is discharged through the regular high voltage coil provided with the engine by the use of a silicon control rectifier switch.

The objectives and advantages of the present invention may be determined from the specification and appended claims which describe the manner of overcoming the above mentioned shortcomings of the prior art, and which is illustrated in the single drawing which is a circuit diagram of the invention.

Two transistors are shown, each having bases, emitters and collectors 2, 4, and 6 respectively. These two transistors are connected to a source of power or a battery 8, which is in turn connected to a primary winding of a transformer 10. The transistors along with the power in the transformer form an oscillator circuit which has a starting circuit utilizing a resistor 12 in series with a parallelly connected diode 14 and capacitor 16 to assure starting of the oscillator circuit. Diodes 18 and 20 are connected across the collector-emitter junctions of the transistors to protect them from kickback voltages of the transformer 10. The secondary of transformer 10 is connected across opposite poles or junction points of a full-wave rectifier bridge circuit 22. A filter circuit has a capacitor 24 connected across the remaining two terminals of the full-wave rectifier 22 and a coil or inductance 26 connected to the negative terminal of the full-wave rectifier output. A diode 28 is connected between the positive terminal of the full-wave rectifier and ground or reference potential. A battery or power supply 30, which may be the same as battery 8, has its negative terminal connected to ground and is connected from its positive terminal through a resistor 31 to one winding of a transformer generally designated as 32. A capacitor 34 is connected between the other end of the last mentioned winding of transformer 32 and ground. A switch 36, which will normally be a set of contact points in a distributor, is connected in parallel with capacitor 34. A diode 38 is connected in parallel with a resistor 39 between the other end of inductance 26 and a cathode 40 of an SCR or silicon controlled rectifier 42. SCR 42 also has an anode which is connected to reference potential and a gate connected to the junction point between diode 38 and inductance 26. The other winding of transformer 32 has one end connected to the gate of SCR 42 and the other end connected through a diode 43 to cathode 40. A diode 44 is connected between anode and cathode of SCR 42 to protect the SCR from kickback voltages from a transformer or coil 46. A charging or storage capacitor 48 has one terminal connected to cathode 40 and the other end connected to one end of the primary and secondary leads of coil 46. The other end of the primary winding of coil 46 is connected to reference potential, while the other end of secondary winding of coil 46 is connected to a distributor generally designated as 50, so as to distribute the spark to the various spark plugs generally designated as 52.

In operation, the oscillator utilizing the two transistors provides an alternating voltage which is rectified by the rectifier bridge 22 and thereby produces a high voltage direct current signal across capacitor 24. This power signal flows through diode 28 and the primary winding of coil 46 to charge capacitor 48. When switch 36 closes, a pulse of current flows through the winding of transformer 32 connected to switch 36, but a diode connected in the series with the other winding of transformer 32 prevents any signal from being applied to the gate of SCR 42. However, when switch 36 opens, the polarity of the signal obtained in transformer 32 is such that a positive signal is applied to the gate to switch SCR 42 to an ON or actuated condition. When this occurs, capacitor 48 has a low impedance path through which to discharge, and a high voltage spike is applied to the distributor 50 and through the appropriate one of the spark plugs 52.

Since the SCR is a solid state device, there is no problem from tube breakage due to vibration, since vibration generally does not affect solid state devices. Also, since a relatively high voltage is utilized to charge capacitor 48, the regular automotive ignition coil may be used instead of a special transformer such as is often used for solid state ignition systems. Further, the current through the switch 36 necessary to activate SCR 42 is very small, and thus point life may be extended to that life at which mechanical failure will normally occur.

Various improvements and variations upon this embodiment will be thought of by those skilled in the art, and I wish to be limited only by the scope of the appended claims in which I claim:

1. Solid state ignition apparatus comprising, in combination:
    a transistor oscillator circuit including output terminals for providing an alternating output signal;
    a full wave rectifier including input means and positive and negative output means for converting alternating signals received at the input means to a high direct voltage signal;
    means connecting said input means of said full wave rectifier across said output terminals;
    a reference potential means;
    a first diode connected between said positive output means and said reference potential;
    a first capacitor connected between said positive and negative output means;
    a silicon controlled rectifier including anode, cathode and gate, said anode connected to said reference potential;
    an inductor connected between said negative output means and said gate;
    a second diode and a first resistor connected in parallel between said gate and said cathode;
    a transformer for supplying gating signals to said silicon controlled rectifier;
    a third diode connected in series with a first winding of said transformer between said gate and said cathode;

a battery having the negative terminal thereof connected to said reference potential;

a second resistor connected between one end of a second winding of said transformer and the positive terminal of said battery;

means for connecting a switch between the other end of said second winding of said transformer and said reference potential;

a fourth diode connected between said cathode and said anode for preventing destruction of said silicon controlled rectifier by kickback voltages;

a high voltage coil including primary and secondary windings;

a storage capacitor connected between said cathode and one end of each of the coil windings;

means connecting the other end of said primary winding of said coil to said reference potential;

and means connected to the other end of said secondary winding of said coil for providing an output signal to a distributor system of an engine upon each opening of said switch and subsequent actuation of said silicon controlled rectifier.

2. Solid state ignition apparatus comprising, in combination:

a first transformer having a primary winding with three intermediate taps thereon for use with an oscillator circuit and a secondary winding;

a battery having the positive terminal thereof connected to the middle one of said three intermediate taps;

a reference potential connected to the negative terminal of said battery;

a first transistor including base, emitter and collector;

means connecting said collector to said reference potential and said emitter to a second of said taps;

a first diode connected between said emitter and collector;

a first resistor connected between the end of the primary winding nearest the second of said taps and said base;

a second transistor including base, emitter and collector;

means connecting said collector of said second transistor to said reference potential and said emitter of said second transistor to the remaining tap;

a second diode connected between said emitter and collector of said second transistor;

a second resistor connected between said base and said collector of said second transistor;

a third resistor connected in series with a third diode between said base of said second transistor and the other end of said primary winding;

a first capacitor connected in parallel with said third diode;

a full wave rectifier including input means and positive and negative output means for converting alternating signals received at the input means to a high direct voltage signal;

means connecting said input means of said full wave rectifier across said secondary winding;

a fourth diode connected between said positive output means and said reference potential;

a second capacitor connected between said positive and negative output means;

a silicon controlled rectifier including anode, cathode and gate, said anode connected to said reference potential;

an inductor connected between said negative output means and said gate;

a fifth diode and a fourth resistor connected in parallel between said gate and said cathode;

a second transformer for supplying gating signals to said silicon controlled rectifier;

a sixth diode connected in series with a first winding of said second transformer between said gate and said cathode;

a fifth resistor connected between one end of a second winding of said second transformer and said positive terminal of said battery;

a single pole switch for opening when the silicon controlled rectifier is to be actuated;

means connecting said single pole switch between the other end of said second winding of said second transformer and said reference potential;

a third capacitor connected across said single pole switch;

a seventh diode connected between said cathode and said anode for preventing destruction of said silicon controlled rectifier by kickback voltages;

a high voltage coil including primary and secondary windings;

a storage capacitor connected between said cathode and one end of each of the coil windings;

means connecting the other end of said primary winding of said coil to said reference potential;

and means connected to the other end of said secondary winding of said coil for providing an output signal to a distributor system of an engine upon each opening of said single pole switch and subsequent actuation of said silicon controlled rectifier.

References Cited

UNITED STATES PATENTS

| | | | |
|---|---|---|---|
| 3,056,066 | 9/1962 | Dozier | 315—323 |
| 3,078,391 | 2/1963 | Bunodiere et al. | 315—205 |
| 3,219,877 | 11/1965 | Konopa | 315—209 |
| 3,241,032 | 3/1966 | Firestone | 321—2 |
| 3,251,351 | 5/1966 | Bowers | 123—148 |
| 3,256,495 | 6/1966 | Hunter | 331—113 |
| 3,302,629 | 2/1967 | Shano | 123—148 |

OTHER REFERENCES

Popular Electronics, June 1966, pp. 43–47 and 87–88, Gellman, Murray, "Transistorized Capacitor Discharge Ignition System."

JOHN W. HUCKERT, *Primary Examiner.*

J. R. SHEWMAKER, *Assistant Examiner.*